United States Patent
Carpenter, II et al.

(10) Patent No.: US 10,878,824 B2
(45) Date of Patent: Dec. 29, 2020

(54) SPEECH-TO-TEXT GENERATION USING VIDEO-SPEECH MATCHING FROM A PRIMARY SPEAKER

(71) Applicant: Valyant Al, Inc., Denver, CO (US)

(72) Inventors: Robley Carpenter, II, Denver, CO (US); Benjamin Thielker, Denver, CO (US)

(73) Assignee: Valyant Al, Inc., Denver, CO (US)

( * ) Notice: Subject to any disclaimer, the term of this patent is extended or adjusted under 35 U.S.C. 154(b) by 0 days.

(21) Appl. No.: 16/280,633

(22) Filed: Feb. 20, 2019

(65) Prior Publication Data

US 2019/0259388 A1    Aug. 22, 2019

Related U.S. Application Data

(60) Provisional application No. 62/633,240, filed on Feb. 21, 2018.

(51) Int. Cl.
| | | |
|---|---|---|
| *G10L 17/06* | (2013.01) | |
| *G06K 9/00* | (2006.01) | |
| *G10L 15/26* | (2006.01) | |
| *G10L 15/25* | (2013.01) | |

(52) U.S. Cl.
CPC .......... *G10L 17/06* (2013.01); *G06K 9/00315* (2013.01); *G06K 9/00335* (2013.01); *G06K 9/00765* (2013.01); *G10L 15/25* (2013.01); *G10L 15/26* (2013.01)

(58) Field of Classification Search
CPC ......... G10L 15/24; G10L 15/25; G10L 15/26; G10L 17/005; G10L 17/06; G06K 9/00302; G06K 9/00308; G06K 9/00315; G06K 9/00335; G06K 9/00765
See application file for complete search history.

(56) References Cited

U.S. PATENT DOCUMENTS

| | | | |
|---|---|---|---|
| 6,064,957 A | 5/2000 | Brandow et al. | |
| 6,173,259 B1 | 1/2001 | Bijl et al. | |
| 6,584,439 B1 | 6/2003 | Geilhufe et al. | |
| 7,664,643 B2 | 2/2010 | Gopinath et al. | |
| 8,068,639 B2 * | 11/2011 | Ishiwata | G06K 9/00228 382/103 |
| 8,700,392 B1 * | 4/2014 | Hart | G10L 15/25 704/231 |

(Continued)

OTHER PUBLICATIONS

Specification of U.S. Appl. No. 62/546,711, filed Aug. 17, 2017 (Year: 2017).*

(Continued)

*Primary Examiner* — Eric Yen
(74) *Attorney, Agent, or Firm* — Hall Estill Attorneys at Law; Tyler J. Mantooth

(57) ABSTRACT

A method of generating text from speech using video-speech matching from a primary user is disclosed herein. The method requires first receiving a video and audio input. The video and audio inputs are then segmented into a plurality of video and audio features, respectively. The plurality of video and audio features are then matched according to their similarities. A primary speaker is then determined from one of the matched video and audio features. The primary speaker's matched video and audio features are then used to generate a text representative of the primary speaker's speech.

16 Claims, 2 Drawing Sheets

(56) References Cited

U.S. PATENT DOCUMENTS

| | | | |
|---|---|---|---|
| 9,263,044 B1* | 2/2016 | Cassidy | G06K 9/00 |
| 9,548,048 B1* | 1/2017 | Solh | G06K 9/00335 |
| 9,548,050 B2 | 1/2017 | Gruber et al. | |
| 9,584,946 B1* | 2/2017 | Lyren | H04S 7/30 |
| 10,304,458 B1* | 5/2019 | Woo | G10L 15/26 |
| 2002/0116197 A1* | 8/2002 | Erten | G06K 9/6293 |
| | | | 704/273 |
| 2002/0194005 A1* | 12/2002 | Lahr | G10L 15/24 |
| | | | 704/271 |
| 2003/0154084 A1* | 8/2003 | Li | G06K 9/00228 |
| | | | 704/273 |
| 2004/0267521 A1* | 12/2004 | Cutler | G10L 25/78 |
| | | | 704/202 |
| 2006/0080101 A1* | 4/2006 | Chotimongkol | G06F 40/295 |
| | | | 704/257 |
| 2009/0043423 A1* | 2/2009 | Sugiyama | G06F 17/28 |
| | | | 700/245 |
| 2009/0216529 A1* | 8/2009 | Bengtsson | G10L 21/02 |
| | | | 704/233 |
| 2009/0220065 A1* | 9/2009 | Ahuja | G10L 17/00 |
| | | | 379/202.01 |
| 2010/0211387 A1* | 8/2010 | Chen | G10L 25/78 |
| | | | 704/226 |
| 2011/0093273 A1* | 4/2011 | Lee | H04N 21/4394 |
| | | | 704/270 |
| 2012/0022872 A1* | 1/2012 | Gruber | G06F 3/167 |
| | | | 704/270.1 |
| 2013/0166302 A1* | 6/2013 | Mercado | G10L 21/00 |
| | | | 704/251 |
| 2013/0275164 A1* | 10/2013 | Gruber | G06Q 10/02 |
| | | | 705/5 |
| 2014/0098174 A1* | 4/2014 | Summers | G06K 9/6255 |
| | | | 348/14.1 |
| 2014/0149117 A1* | 5/2014 | Bakish | G10L 15/24 |
| | | | 704/248 |
| 2014/0172423 A1* | 6/2014 | Dai | G10L 15/22 |
| | | | 704/231 |
| 2014/0272821 A1* | 9/2014 | Pitschel | G09B 19/06 |
| | | | 434/157 |
| 2014/0337131 A1* | 11/2014 | Edara | G06Q 30/0255 |
| | | | 705/14.53 |
| 2015/0046161 A1* | 2/2015 | Locker | G09B 5/00 |
| | | | 704/246 |
| 2015/0049952 A1* | 2/2015 | Cholayil | A61B 5/107 |
| | | | 382/195 |
| 2015/0088515 A1* | 3/2015 | Beaumont | G10L 17/06 |
| | | | 704/251 |
| 2015/0149169 A1* | 5/2015 | Chang | H04R 25/55 |
| | | | 704/235 |
| 2016/0140956 A1* | 5/2016 | Yu | G10L 15/08 |
| | | | 704/240 |
| 2017/0083285 A1* | 3/2017 | Meyers | G10L 15/1815 |
| 2017/0280235 A1* | 9/2017 | Varerkar | G10L 15/02 |
| 2018/0232201 A1* | 8/2018 | Holtmann | G06K 9/00362 |
| 2018/0315429 A1* | 11/2018 | Taple | G06Q 50/18 |
| 2018/0350405 A1* | 12/2018 | Marco | G11B 27/031 |
| 2019/0058847 A1* | 2/2019 | Mayer | H04N 7/15 |
| 2019/0080692 A1* | 3/2019 | R | G10L 21/0272 |
| 2019/0147882 A1* | 5/2019 | Pankanti | G06Q 10/10 |
| | | | 704/231 |
| 2019/0180343 A1* | 6/2019 | Arnett | G06Q 30/0643 |

OTHER PUBLICATIONS

U.S. Appl. No. 10/076,194, filed Feb. 14, 2002.
U.S. Appl. No. 12/628,514, filed Dec. 1, 2019.
U.S. Appl. No. 14/036,728, filed Sep. 25, 2013.

* cited by examiner

SPEECH-TO-TEXT GENERATION USING VIDEO-SPEECH MATCHING FROM A PRIMARY SPEAKER

CROSS-REFERENCE TO RELATED APPLICATIONS

This is a non-provisional application which claims priority to U.S. Provisional Application No. 62/633,240 filed Feb. 21, 2018. The disclosures of the prior application is hereby incorporated by reference herein in its entirety.

BACKGROUND

Field of the Technology

The present disclosure relates generally to speech-to-text generation employing pattern recognition, speech separation, video-speech mapping, lip reading, and natural language processing principles.

Brief Description of the Prior Art

Digital assistant systems have become quite pervasive in today's hi-tech world. They may be in the form of software running on mobile cell phones or browser-based website applications, or they may be in the form of in-home devices that look like speakers that provide users with a way to ask questions and receive information through voice inputs. For example, interested readers may review U.S. Pat. No. 9,548,050, titled "Intelligent Automated Assistant," and U.S. Pat. No. 6,584,439, titled "Method and Apparatus for Controlling Voice Controlled Device." These digital assistant systems primarily rely on a vocal input from a user and speech-to-text generation technologies to receive and translate the acoustic vocal input into machine-readable text that can then be intelligently interpreted. The speech-to-text generation for these digital assistant systems is, however, often inaccurate.

Speech-to-text generation, also known as speech recognition or speech processing, is the process of converting an acoustic signal, captured by a microphone or a telephone, to a set of words. Currently available speech-to-text generator systems may be in the form of software running on mobile cell phones or browser-based website applications that provide users with a way to speak into a microphone or telephone and receive a visual output of text representative of the input speech on some form of display screen. For example, interested readers may review U.S. Pat. No. 6,173,259, titled "Speech to text conversion", and U.S. Pat. No. 6,064,957, titled "Improving speech recognition through text-based linguistic post-processing".

In recent years, there have been many improvements to speech-to-text generators to improve transcription accuracy. In particular, U.S. patent application Ser. No. 12/628,514 (hereinafter "Kim") describes a combined lip reading and voice recognition multimodal interface system that allows a driver to speak to a digital assistant and receive directions from the digital assistant while driving a car. This invention requires a vocal input as well as a lip video image input from a user to provide a more accurate representation of what the user was trying to say. Unfortunately, Li is compatible with only one user to provide the vocal and lip video image input; in other words, Li's voice recognition or speech-to-text generator system would not work properly if more than one user was speaking at the same time.

The problem of separating speech samples from multiple users in a single acoustic signal was addressed in U.S. Pat. No. 7,664,643 (hereinafter "Gopinath"), which discloses a system and method for speech separation and multi-talker speech recognition. Although Gopinath discloses a system for speech separation of a signal that contains the simultaneous speech of multiple speakers, Gopinath does not disclose a system or method for improving the speech recognition or speech-to-text generation for one of the separated speech samples. Further Gopinath does not disclose a system or method for identifying a primary speaker for a digital assistant system when multiple people are speaking simultaneously, nor does he use a video image input to associate a speech sample with a speaker.

Person identification using video-speech matching was disclosed in U.S. patent application Ser. No. 10/076,194 (hereinafter "Li"). Li essentially disclosed a system that segmented video and audio features from video data to then correlate the segmented video and audio features. Li, however, failed to disclose a system for identifying a primary speaker and his or her vocal input from video data. U.S. patent application Ser. No. 14/036,728 (hereinafter "Beaumont"), however, discloses a method for identifying a primary speaker from a visual sensor and one or more microphones in an information handling device when multiple speakers are speaking concurrently. Both Li and Beaumont, however, are not concerned with using a segmented video image of a speaker to determine the content of a segmented speech sample, but rather they are concerned with using the segmented video image data to determine the identity of the speaker providing the segmented speech sample.

What is needed is a new and improved method for generating text from speech from a primary speaker when multiple speakers are speaking simultaneously. The new method requires receiving a video image input, receiving an audio input, segmenting the video image input into a plurality of video features, segmenting the audio input into a plurality of audio features, matching the plurality of video features to the plurality of audio features, selecting a primary speaker from one of the matched video and audio features, and generating text from the matched video feature and audio feature of the primary speaker.

In summary, no method currently exists that generates text from speech using video-speech matching from a primary speaker.

SUMMARY

Disclosed herein is a method for improving the accuracy of speech-to-text generation by using video-speech matching from a primary speaker. In one embodiment, the method comprises receiving a video image input and receiving an audio input. The method further provides segmenting the video image input into a plurality of video features and segmenting the audio input into a plurality of audio features. The method further provides matching the plurality of video features to the plurality of audio features, selecting a primary speaker from one of the matched video and audio features, and generating text from the matched video feature and audio feature of the primary speaker.

BRIEF DESCRIPTION OF THE DRAWINGS

The following description and associated figures teach the best mode of the disclosure. For the purpose of teaching inventive principles, some conventional aspects of the best mode can be simplified or omitted. The following claims specify the scope of the disclosure. Note that some aspects of the best mode cannot fall within the scope of the disclosure as specified by the claims. Thus, those skilled in the art will appreciate variations from the best mode that fall within the scope of the disclosure. Those skilled in the art will appreciate that the features described below can be combined in various ways to form multiple variations of the disclosure. As a result, the disclosure is not limited to the specific examples described below, but only by the claims and their equivalents.

DETAILED DESCRIPTION OF THE EXEMPLARY EMBODIMENTS

Figure 1:
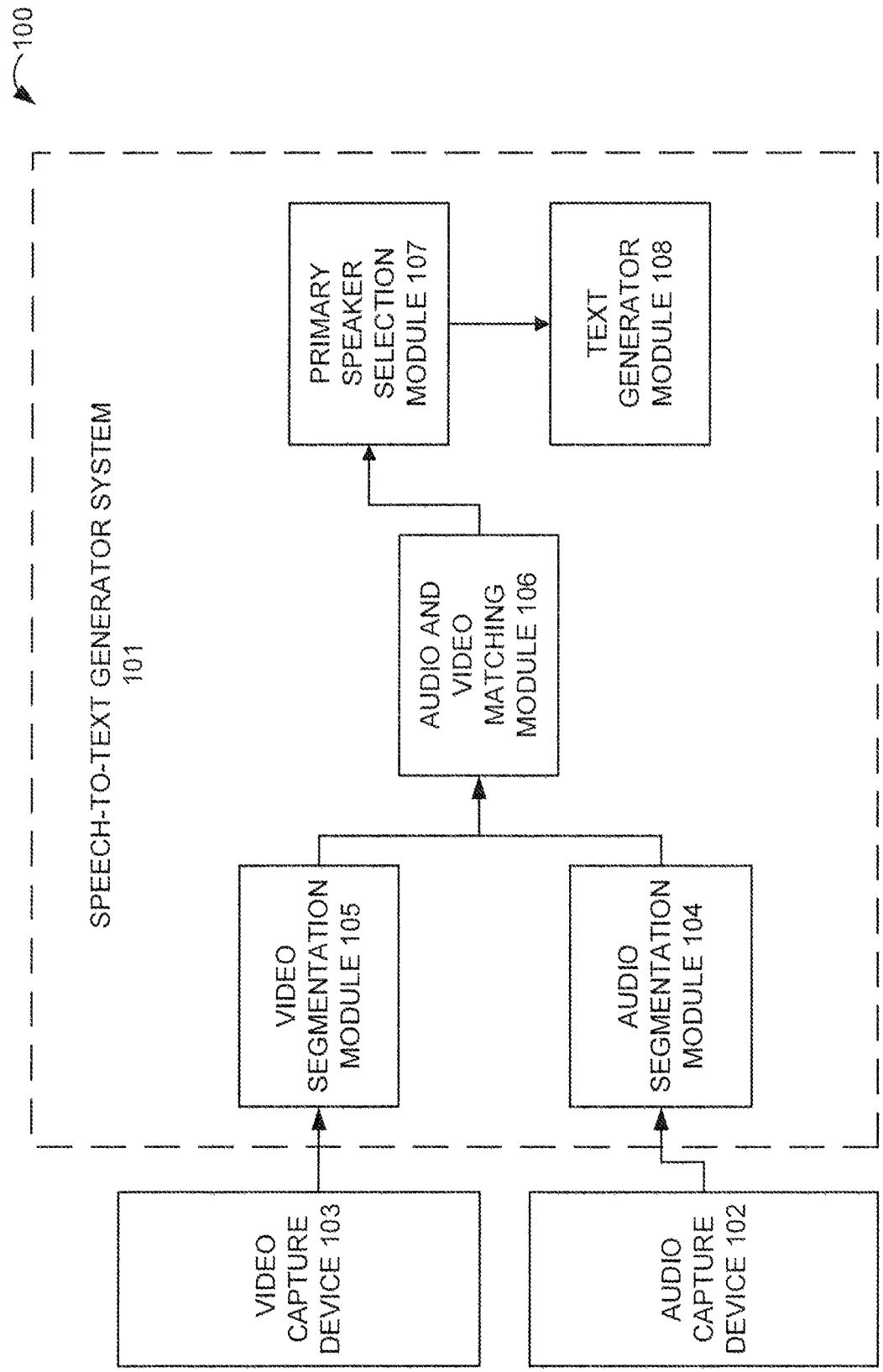
FIG. 1 is a block diagram illustrating the general functional components of a method of speech-to-text generation using video-speech matching from a primary speaker.

Embodiments of the present disclosure will now be described in detail with reference to the drawings, which are provided as illustrative examples of the disclosure so as to enable those skilled in the art to practice the disclosure. Notably, the figures and examples below are not meant to limit the scope of the present disclosure to a single embodiment, but other embodiments are possible by way of interchange of some or all of the described or illustrated elements.

Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure. In the present specification, an embodiment showing a singular component should not be considered limiting; rather, the disclosure is intended to encompass other embodiments including a plurality of the same component or nested stages, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

In general, the present application is designed to improve speech-to-text generation accuracy using video-speech matching. The present application also facilitates a user's ability to speak into a microphone or telephone and have their recorded speech accurately transcribed when other people are present and speaking concurrently into the same microphone. The present application further uses video and audio segmentation processing to determine a primary speaker speaking into a microphone. The present application also uses lip reading software to more accurately generate text representative of recorded speech. The hardware used in this disclosure are video and audio recording devices, and can be deployed in almost any location. There is no requirement for additional hardware from the user to interact with the video and audio recording devices and have their speech translated into text.

The present disclosure is motivated by the need to provide a more accurate textual representation or transcription of a user's speech input in a noisy environment. The resulting method is a completely new disclosure that does not exist anywhere, or in any form. The key software programs include pattern recognition, speech separation, video-speech mapping, lip reading, and natural language processing.

The new proposed method improves upon every one of these existing methods in a variety of different ways. The new method uses concurrent video and audio recordings of the speech of more than one user to first segment the video recordings into video features and segment the audio recordings into audio features, each feature representative of a human speaker. The new method then matches the video and audio features of the human speakers to associate a certain speech with an image, such as a user's face or lip movements. The new method further processes the video and audio feature matches to determine a primary speaker. The new method last uses the matched video and audio features of the primary speaker to then generate a text corresponding to the primary speaker's speech input.

There are six key components required to successfully create the method of the disclosure. They include, but are not limited to, pattern recognition, speech separation, video-speech matching, lip reading, and natural language processing.

Pattern recognition generally refers to a type of machine learning that focuses on the recognition of patterns and regularities in data. Pattern recognition is also the assignment of a label or category to a given input value. Pattern recognition systems are first trained by inputting multiple training patterns and forming categories based on the received input training patterns. After training, the pattern recognition system takes input data and compares it to categories and, based on the comparison, identifies the data as belonging to one of the categories learned from training. In the present disclosure, pattern recognition is used to classify video image data into categories (or "video features") of speakers. For instance, pattern recognition is used to identify how many speakers are in a given image, to train the pattern recognition system the visual aspects of each identified speaker (such as the speaker's face), and to classify successive video image data into a plurality of classes of speakers.

Speech separation generally refers to a process of receiving a single acoustic signal containing human speech from two or more people and modelling the signal in such a way that the various frequencies contained in the acoustic signal can be separated or filtered to render separate acoustic signals representative of one person's speech. Single channel speech separation has been attempted using Gaussian mixture models as well as using the modeling techniques discussed in "Gopinath" above. In the present disclosure, speech separation is used to separate a received acoustic signal containing the speech of two or more people into two or more acoustic signals, each containing the speech of a different person.

Video-speech matching is a process that matches video data with corresponding audio data. Certain applications of video-speech matching, such as face-speech matching, use low-level audio and visual features to associate faces with speech. For instance, lip movement detection and analysis in video data can be used to attempt to match the video data with audio data, as demonstrated in "Li" referenced above. In the present disclosure, video-speech matching is used to associate the faces or lip movements of speakers with the separated speech samples of each identified speaker. In an embodiment, the video data is sourced from a plurality of cameras. The video may then be compared and matched to identical timestamps by methods well known by those skilled in the art. The present inventor has recognized a particular advantage of the utilization of a plurality of cameras to source the video input, namely that such configuration allows for depth mapping, and also adds to the confidence level in mechanisms associated with visual detection and analysis of facial movements in association with aspects of the invention. Further, utilization of a plurality of cameras allows aspects of the invention to determine a particular face as the source of audio with an enhanced confidence level, which has particular utility in a noisy environment.

Lip reading is the visual detection and analysis of the movement of a speaker's lips to determine what the speaker is saying. Some digital assistant systems integrate lip reading systems with audio-based voice recognition systems to process verbal commands from a user, as demonstrated in "Kim" discussed above. In the present disclosure, lip reading software is used, along with natural language processing from a received audio input, to determine the content of a primary speaker's speech.

Speech to text processing is utilized to record incoming speech from users and then convert the incoming speech into text. Speech to text processing is currently used by several major technology corporations for a variety of reasons. One major commercial application is for converting speech into text to be displayed on some form of screen. This facilitates word processing for users what cannot type or use a keyboard efficiently. These common applications are generally accomplished through the use of microphones and digital assistant software that is embedded into mobile cell phones and into pieces of hardware that look like speakers. Instances of speech to text processors include IBM's Watson, the Google Cloud Natural API, Window's Cortana, Apple's Siri, Intel's RealSense, and Dragon's Speech Recognition Software, among others. In the present disclosure, speech to text processing is used to generate text from a primary speaker's recorded speech. Embodiments of the invention utilize a plurality of microphones, optionally a microphone array, to measure the time between the origin of the audio and each microphone to determine which speaker is the actual source of the audio based in part on proximity to each microphone, as determined by measurement of the miniscule differential of the time at which the audio is detected by each microphone.

Natural language processing is utilized to determine contextual meaning from transcribed text. As is well-understood by those skilled in the art, natural language processing is used by all major conversational AI platforms in association with the purpose of understanding the meaning in user inquiries. Instances include Amazon Alexa, which interprets the requests of customers and takes appropriate actions, like ordering something from the Amazon shopping platform, playing a specific song, or modifying the lights inside a house. In the present disclosure, natural language processing is used to understand the meaning of customer requests and for contextual analysis of audio input, such audio input optionally retrieved from a plurality of microphones. The present inventor has recognized the value of natural language processing with modifications featuring a plurality of microphones and cameras to assist in distinguishing a particular speaker in a fast food environment from background noise.

As a first example employing the method of speech-to-text generation using video-speech matching from a primary speaker, FIG. 1 is presented. FIG. 1 is a block diagram illustrating the general functional components of a method of speech-to-text generation using video-speech matching from a primary speaker. In the non-limiting embodiment, the components of the method 100 include a speech-to-text generator system 101, an audio capture device 102, a video capture device 103, an audio segmentation module 104, a video segmentation module 105, an audio and video matching module 106, a primary speaker selection module 107, and a text generator module 108.

The speech-to-text generator system 101 may be one or more computing devices configured to perform the speech-to-text generation method. The speech-to-text generator system 101 may include a plurality of processing systems that can be implemented within a single processing device or can also be distributed across multiple processing devices or sub-systems that cooperate in executing program instructions, such as cloud computing systems. The audio capture device 102 may be in the form of a microphone embedded on a computer monitor or a telephone. The audio capture device 102 is preferably configured to capture human speech. The audio capture device 102 may also comprise an array of microphones. The video capture device 103 may be a visual sensor, e.g. a camera, an IR sensor, or even an acoustic sensor utilized to form image data. For ease of illustration and description, the audio capture device 102 and the video capture device 103 are described separately in this description; however, this is only by way of example.

The audio segmentation module 104 and the video segmentation module 105 are one or more computing devices that are configured to perform audio and video segmentation processing, respectively. The audio segmentation module 104, more specifically, comprises one or more processors and memory to receive audio data from the audio capture device 102 and segment the received audio data into audio features, the audio features comprising audio data from different speakers. In a preferred embodiment, the segmented audio data is an audio recording of a speaker's speech. The video segmentation module 105, more specifically, comprises one or more processors and memory to receive video data from the video capture device 103 and segment the received video data into video features, the video features comprising video data from different speakers. In a preferred embodiment, the segmented video data is a video recording of a speaker's face, lip movements, body movements, among other visual aspects.

The audio and video matching module 106 is one or more computing device configured to match the segmented audio features from the audio segmentation module 104 with the video features of the video segmentation module 105. The audio and video matching module 106 may assign confidence scores to various combinations of audio and video features and then "match" the combined audio and video features with the highest confidence scores. It should be understood that other techniques may be used to draw similarities between the plurality of audio and video features.

The primary speaker selection module 107 is one or more computing devices configured to select a "match" of the plurality of audio and video features that is most likely the primary speaker. For example, a primary speaker may be a person who comprises the largest number of pixels in a given video feature, and is therefore the person closes to the video capture device 103. Alternatively, the primary speaker may be the speaker whose spoken decibel level is the highest among other audio features. Further, the primary speaker may be one who is using certain a vocabulary typically used in a retail environment, such as "I would like to buy" or "May I please have". It should be understood that the determination of a primary speaker is not limited to the above examples, and the operator of the method of speechto-text generation is free to determine what is a primary speaker. In a preferred embodiment, there is only one primary speaker.

Last, the text generator module 108 is one or more computing devices configured to generate text from the audio and video features of the determined primary speaker. In operation, the speech to text generator system 101 receives concurrent audio and video data from the audio capture device 102 and the video capture device 103, segments the audio data into a plurality of audio features using the audio segmentation module 104, and segments the video data into a plurality of video features using the video segmentation module 105. The audio and video matching module 106 then matches the pluralities of audio features with the plurality of video features. The primary speaker selection module 107 then determines a primary speaker from one of the plurality of audio and video feature matches. Last, the text generator module 108 generates text representative of the matched audio and video feature of the primary speaker. For example, the text generator module 108 may use the video feature of the primary speaker to perform a lip-reading analysis and generate text representative of the movement of the primary speaker's lips. Further, the text generator nodule 108 may perform natural language processing on the audio feature of the primary speaker to generate text representative of the primary speaker's recorded speech. The text generator module 108 may be configured to use only the primary speaker's audio feature, video feature, or both, to generate a text representative of the primary speaker's speech. In a preferred embodiment, the text generator module 108 uses both the audio and video feature of the primary speaker to determine the most accurate text representative of the primary speaker's speech.

It should be understood that the general functional components of a method of speech-to-text generation using video-speech matching from a primary speaker, as presented in FIG. 1, are connected by a variety of communication links, wired or wireless. These links are, however, omitted for clarity.

Figure 2:
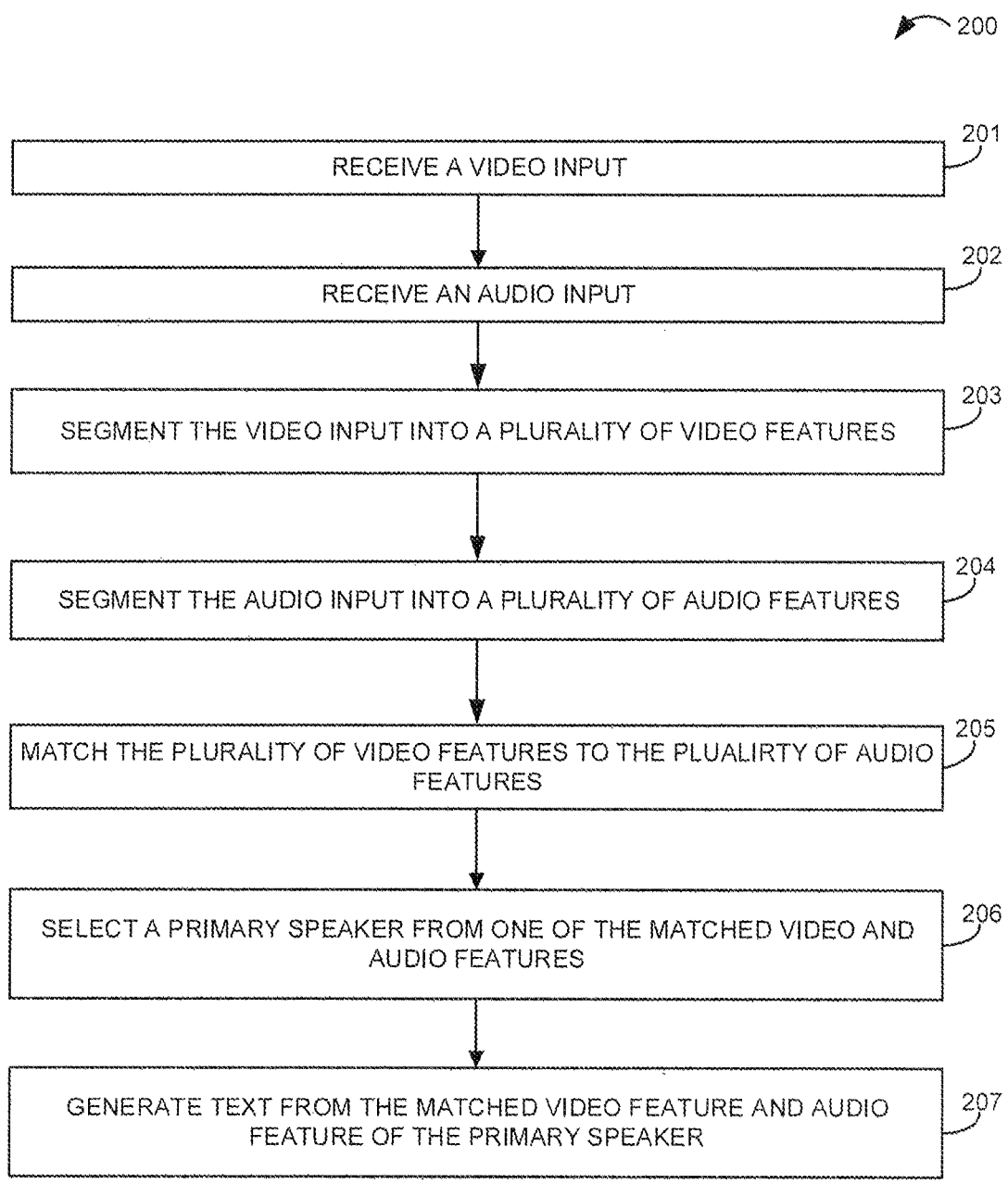
FIG. 2 is a flow diagram illustrating a method of speech-to-text generation using video-speech matching from a primary speaker.

To further illustrate the method of the disclosure, FIG. 2 is presented. FIG. 2 is a flow diagram illustrating a method of speech-to-text generation using video-speech matching from a primary speaker. The method provides first receiving a video input (201). The method then provides receiving an audio input (202), preferably through a microphone. The method then, at the video segmentation module 105, segments the received video input into a plurality of video features (203). The method then, at the audio segmentation module 104, segments the received audio input into a plurality of audio features (204). The method further provides, at the audio and video matching module 106, matching the plurality of video features to the plurality of audio features (205). The method then provides, at the primary speaker selection module 107, selecting a primary speaker from one of the matched video and audio features (206). The method then concludes, at the text generator module 108, by generating text from the matched video feature and audio feature of the primary speaker (207).

Persons skilled in the art would understand that the steps of flowchart 200 are exemplary. Additional steps may be added, sequence of some of the steps may be altered, and/or some steps may be omitted based on particular embodiments.

There are numerous advantages to the method discusses in this disclosure, the overarching advantage being the ability to generate, from one or more computing devices, an accurate transcription of a primary speaker's speech or utterance when more than one person is speaking at or around the one or more computing devices. In a preferred embodiment, the primary speaker's speech can be processed in real-time or as a recording contained in an audio and video file. The method allows speech to text generators to work properly and accurately in noisy environments where one primary speaker is verbally requesting something.

One application of the method of the disclosure would be to produce text on a word processor from a received speech input in a noisy environment. Using both an audio recording and a concurrent video image to accurately isolate and transcribe speech will effectively improve the accuracy of the transcription. Another application of the method of the disclosure would be to generate text from speech in a retail sales environment, office environment, or other location that requires services through a verbal exchange (ex. shopping mall directions). For instance, a real-time system employing the method of the disclosure may be used to facilitate a verbal exchange between two people where one person is hearing-impaired and cannot hear what the other person is trying to say. Some specific non-limiting illustrative use cases are described below.

Use case 1: An elderly man is not very skilled at typing and would like to write a letter to his grandson. The elderly person will open a word processor and speak into a microphone. The word processor is communicatively coupled to a speech-to-text generator system that uses both a camera and a microphone to produce an accurate transcription of the elderly man's speech. As the elderly man speaks into the microphone and towards the camera, his wife approaches from behind and starts asking him something. The speech-to-text generator system identifies the two speakers, segments the old man and his wife's respective audio and video channels, matches the audio and video channels for the old man and his wife, determines that the old man is the primary speaker, and generates text representative of the old man's speech that is immediately displayed on the word processor in front of the old man.

Use case 2: A girl wishes to place a fast food order at a digital kiosk. The digital kiosk comprises a camera, a microphone, and one or more computing devices that perform the speech to text generation method of the disclosure. As the girl verbally places her order, a loud man is talking on his cell phone in line behind her. The speech-to-text generator system contained in the digital kiosk identifies the two speakers, segments the girl's and the loud man's respective audio and video channels, matches the audio and video channels for the girl and the loud man, determines that the girl is the primary speaker, and generates text representative of the girl's speech. The digital kiosk then takes the generated text and applies an artificial intelligence program to process and respond to the generated text.

The disclosure has been described in terms of particular embodiments. Other embodiments are within the scope of the following claims. For example, the steps of the disclosure can be performed in a different order and still achieve desirable results.

Insofar as the description above and the accompanying drawings disclose any additional subject matter that is not within the scope of the single claim below, the inventions are not dedicated to the public and the right to file one or more applications to claim such additional inventions is reserved. In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The terms "coupled" and "linked" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

The invention claimed is:

1. A method comprising:
receiving a video input with a camera of a speech-to-text generator system;
receiving an audio input from a first audio source and a second audio source with a microphone of the speech-to-text generator system;
segmenting the video input into a plurality of video features with the speech-to-text generator system;
segmenting the audio input into a plurality of audio features with the speech-to-text generator system;
assessing a first proximity from the first audio source to the microphone and a second proximity from the second audio source to the microphone from the plurality of audio features with the speech-to-text generator system;
correlating at least one of the plurality of video features to at least one of the plurality of audio features to identify the first audio source as a first speaker and the second audio source as a second speaker with the speech-to-text generator system;
determining, with the speech-to-text generator system, the first identified speaker as louder and farther away from the speech-to-text generator system than the second identified speaker despite a face of the first identified speaker being obscured from the camera;
selecting the second identified speaker as a primary speaker between the first and second identified speakers from the assessed first and second proximities in combination with at least one video feature correlated with at least one audio feature with the speech-to-text generator system, the at least one video feature indicating the second identified speaker occupies a larger number of pixels than the first identified speaker; and
generating text from audio received from the primary speaker with the speech-to-text generator system.

2. The method of claim 1, the audio input comprising a received audio signal containing an audible speech of two or more people.

3. The method of claim 1, the video input comprising video obtained from a plurality of cameras.

4. The method of claim 1, the plurality of video features consisting of video features each comprising video data from a differentiated speaker.

5. The method of claim 1, the plurality of video features consisting of video features each comprising a video recording of a speaker's face, lip movements, and body movements.

6. The method of claim 1, the plurality of audio features each containing a speech of a different person.

7. The method of claim 1, the correlating of at least one of the plurality of video features to at least one of the plurality of audio features further comprising an association of faces or lip movements of the video input with a first separated speech sample and a second separated speech sample of the audio input to determine a first identified speaker and a second identified speaker.

8. The method of claim 1, the microphone and camera each positioned within a kiosk.

9. The method of claim 1, further comprising:
determining a distance based on a number of pixels occupied by an identified speaker.

10. The method of claim 1, the speech-to-text generator system ignores at least one audio feature of the plurality of audio features determined to originate from the first audio source.

11. A method comprising:
receiving a video input with a camera of a system;
receiving an audio input from a first audio source and a second audio source with an array of microphones of the system;
segmenting the video input into a plurality of video features with the system;
segmenting the audio input into a plurality of audio features with the system;
correlating, with the system, at least one of the plurality of video features to at least one of the plurality of audio features to identify the first audio source as a first speaker and the second audio source as a second speaker;
determining, with the system, the first identified speaker as louder and farther away from the system than the second identified speaker despite a face of the first identified speaker being obscured from the camera;
selecting the second identified speaker as a primary speaker between the first and second identified speakers with a primary speaker selection module based on at least two detected criteria that indicate which identified speaker is most likely the primary speaker;
generating text from audio received from the primary speaker with the system.

12. The method of claim 11, wherein one of the at least two detected criteria is a first number of pixels occupied by the first identified speaker compared to a second number of pixels occupied by the second identified speaker.

13. The method of claim 11, wherein one of the at least two detected criteria is a measured decibel level.

14. The method of claim 11, wherein one of the at least two detected criteria is use of a vocabulary conducive to a retail environment.

15. The method of claim 14, wherein the vocabulary conducive to a retail environment comprises the term "I would like to buy".

16. The method of claim 14, wherein the vocabulary conducive to a retail environment comprises the term "May I please have".

\* \* \* \* \*